United States Patent [19]

Sharabash

[11] 3,914,401

[45] Oct. 21, 1975

[54] ENTERIC COMPOSITIONS
[75] Inventor: Moustafa M. Sharabash, Indianapolis, Ind.
[73] Assignee: Eli Lilly and Company, Indianapolis, Ind.
[22] Filed: Mar. 20, 1974
[21] Appl. No.: 452,888

Related U.S. Application Data
[63] Continuation-in-part of Ser. No. 188,591, Oct. 12, 1971.

[52] U.S. Cl. .................. 424/19; 424/32; 424/33
[51] Int. Cl.$^2$ ..................................... A61K 27/00
[58] Field of Search ................... 424/19–22, 424/32–33

[56] References Cited
UNITED STATES PATENTS
3,143,472  8/1964  Lappas et al. ................... 424/33
3,509,111  4/1970  Samour ........................... 260/78.5
3,510,542  5/1970  Strand ............................. 260/874
3,532,769  10/1970  Dalibor et al. .................. 260/855
3,556,763  1/1971  Gower et al. ....................... 71/78

FOREIGN PATENTS OR APPLICATIONS
1,133,277  4/1968  United Kingdom

*Primary Examiner*—Shep K. Rose
*Attorney, Agent, or Firm*—Ralph W. Ernsberger; Everet F. Smith

[57]  ABSTRACT

Partial alkylene glycol ether esters of $C_1$-$C_4$ alkyl acrylate-unsaturated polybasic carboxylic acid anhydride copolymers and useful enteric compositions prepared therewith.

12 Claims, No Drawings

ENTERIC COMPOSITIONS

CROSS-REFERENCE

This application is a continuation-in-part of copending application Ser. No. 188,591, filed Oct. 12, 1971.

BACKGROUND OF THE INVENTION

1. Field of the Invention

This invention relates to pharmacy. More particularly, this invention relates to copolymers having enteric coating properties and enteric and sustained-release medicaments wherein part or all of the drug is released outside the pH of the gastric environment.

2. Description of the Prior Art

There is extensive literature detailing attempts to prepare pharmaceutically acceptable coatings that have enteric properties. A large number of patents have issued disclosing many different enteric coatings and describing these as "enteric medicaments," "extended release," "sustained release," etc. The majority of the patents and a large segment of the literature have dealt with naturally occurring materials as contrasted with synthetic polymers.

A common approach is to use various combinations of naturally-occurring materials which provide coatings that do not in fact exhibit any preferential solubilities at different pH's, depending instead on a slow rate of disentegration of the coating to make the drug physiologically available only after a considerable time following ingestion.

Another approach is to apply an excessive number of coatings of either the same or different materials, resulting in a coating having substantial thickness, thus requiring a longer time to dissolve.

In some cases synthetic polymers and copolymers have been used, either alone or in combination with naturally-occurring materials. Cellulose acetate hydrogen phthalate was one of the first of the synthetic polymers to gain acceptance as an enteric material. More recently U.S. Pat. No. 3,143,472 disclosed a series of esterified polymers and copolymers having enteric properties.

The prior art synthetic polymers and copolymers require some degree of external plasticization to render them suitable for use as enteric coatings, and this leads to problems related to the compatibility of the plasticizers and polymers, the toxicity of the plasticizer, and the integrity of the film formed by a plasticized polymer. A pharmaceutically acceptable polymer or copolymer with intrinsic flexibility which would eliminate the need for plasticization would be a significant advance in the art of enteric medicaments.

Prior art synthetic copolymers of monoesters of maleic, itoconic and citraconic acids with esters of acrylic or methacrylic acids have been taught as having utility as adhesives. Specifically, U.S. Pat. No. 3,509,111 teaches that copolymers of alkylaminoalkylene esters of maleic, itaconic and citraconic acids and alkyl acrylates and methacrylates are useful as pressure-sensitive adhesives.

Other prior art sources report the preparation of alkoxy polyalkylene glycol half esters of maleic anhydride, and the subsequent copolymerization of such monomers with vinyl acetate. British Pat. No. 1,133,277 teaches that such copolymers are useful for use in gummed products to provide an adhesive coating capable of developing adhesive tackiness when moistened with water.

SUMMARY

It has now been discovered that novel partial alkylene glycol ether esters of $C_1$-$C_4$ alkyl acrylate-unsaturated polybasic carboxylic acid anhydride copolymers are useful for preparing enteric and sustained release medicaments of high quality. The partial esters are prepared from a mono $C_1$-$C_4$ ether of a $C_2$-$C_3$ alkylene glycol having from 1 to 4 repeating alkylene moieties. The carboxylic acid anhydride is either maleic, citraconic or itaconic. The esterified copolymers dissolve at a pH of from about 5.5 to about 7.0 or above. Enteric and sustained release medicaments utilizing such copolymers are provided.

DESCRIPTION OF THE PREFERRED EMBODIMENT

The novel enteric coating provided in this invention are partial alkylene glycol ether esters of $C_1$-$C_4$ alkyl acrylate-unsaturated polybasic carboxylic acid anhydride copolymers selected from the group having as a general formula either

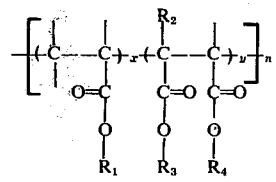

or

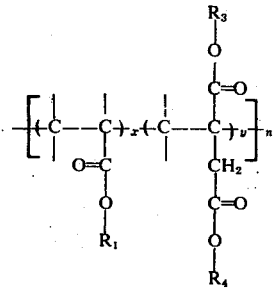

wherein
$R_1$ is $C_1$-$C_4$ alkyl;
$R_2$ is hydrogen or methyl;
$R_3$ and $R_4$ are hydrogen or the moiety

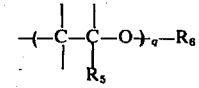

wherein
$R_5$ is hydrogen or methyl, and
$R_6$ is $C_1$-$C_4$ alkyl;
with the proviso that from about 10 to about 50 percent of the total potential of $R_3$ and $R_4$ is other than hydrogen;
$n$ is above 70;
$q$ is a whole number from 1 to 4; and
$x$ and $y$ are whole numbers from 1 to 5.

A copolymer described by the general formulas indicated above is comprised of repeating structural units of a $C_1$-$C_4$ alkyl acrylate and either maleic, citraconic, or itaconic anhydride present in a chain, preferably maleic anhydride; the anhydride moiety having been opened and esterified with a mono $C_1$-$C_4$ alkyl ether of either an ethylene or propylene glycol having from 1 to 4 repeating $C_2$ or $C_3$ alkylene units to the extent that from about 10 to about 50 percent of total potential carboxyl groups on the chain are in the form of the ester group —COOR, where R is the alkylene glycol ether part of the alcohol.

The acrylate monomer can be either methyl, ethyl, n-propyl, isopropyl, n-butyl, isobutyl, sec-butyl, or t-butyl acrylate. The unsaturated polybasic carboxylic acid anhydride monomer can be either maleic, citraconic or itaconic anhydride. When the copolymer useful in this invention is prepared from equimolar amounts of any $C_1$-$C_4$ alkyl acrylate and maleic anhydride, it is indicated that the repeating units of $x$ and $y$ in the general formulas detailed above are in a ratio of at least about 1 to 1. This is because maleic anhydride can be homopolymerized only under severe conditions recognized by those skilled in polymer chemistry. While acrylates readily homopolymerize, repeated titrations have consistently shown that in an acrylate-maleic anhydride system each acrylate unit is bonded to a maleic anhydride unit and vice versa.

The copolymerization of a $C_1$-$C_4$ alkyl acrylate and citraconic anhydride does not tend to build through alternating units of each monomer to the extent that maleic anhydride does. However, in any event the alkylene units derived from each of the monomers in the copolymer are to be utilized in a mole ratio so that in the total copolymer the ratio of the repeating units of $x$ and $y$ in the general formulas above is from 1:5 to 5:1.

The alkylene units derived from itaconic anhydride in a copolymer with a $C_1$-$C_4$ alkyl acrylate tend to have a greater degree of randomness in the sequence of structural units in the copolymer than is experienced in either the copolymer including maleic anhydride or citraconic anhydride. Again, however, the starting monomers are employed in a mole ratio such that the ratio of the repeating alkylene structural units, $x$ and $y$, in the total copolymer is from 1:5 to 5:1. This will be understood by those skilled in the art of polymer chemistry.

The novel compounds of this invention can be prepared by reacting the copolymers discussed above with any one of a number of mono $C_1$-$C_4$ alkyl ethers of $C_2$ or $C_3$ alkylene glycols having from 1 to 4 alkylene units in the structure. Moreover, such reaction can be carried out simply and economically. The resulting products are enteric materials which are resistant to dissolving in simulated gastric solution having a pH below about 5.5, but which dissolve readily in simulated intestinal fluid having a pH about 7.

The useful compounds of this invention can be prepared by a two-step process which does not require the isolation of the copolymer from the reaction mixture prior to the esterification of the copolymer. The appropriate unsaturated polybasic carboxylic acid anhydride (acid free) is added to a suitably equipped reaction vessel and heated to about 70°C. The $C_1$-$C_4$ alkyl acrylate (containing 15 ppm of p-methoxyphenol) desired as a constituent in the copolymer and an initiator, such as t-butyl peroctoate, are added slowly to the molten anhydride. About one-quarter of the initiator is added directly to the reaction mixture shortly after the acrylate addition is started. The remainder of the initiator is added concurrently with the acrylate.

As the polymerization reaction proceeds, heat is generated by the exothermic character of the reaction. Care is exercised to keep the temperature below 80°C., and the reaction temperature is controlled to maintain a temperature at about 75°C. during the entire reaction.

When all of the acrylate has been added to the reaction mixture a quantity of a solvent such as benzene, xylene, ethylene dichloride, carbon tetrachloride, and the like, is added to the reaction mixture in an amount approximately equal in volume to the volume of the acrylate monomer, and the reaction continued to completion.

At the conclusion of the polymerization reaction, the esterification to a partial ester of the copolymer is accomplished by adding the appropriate alkylene glycol ether as specified hereinbefore, in an amount calculated to provide for the degree of esterification desired, to the solution of the copolymer. Vigorous agitation is required during this addition. A solution of sodium methoxide in the alkylene glycol ether employed in the esterification is added to the reaction mixture. The temperature is maintained at about 70°C., vigorous agitation is continued, and the esterification is complete after about 30-60 minutes. The reaction mixture is cooled to room temperature, and the desired partial ester of the copolymer is precipitated by adding the reaction mixture to 10 volumes of a 0.1N HCl solution with vigorous and efficient stirring. Residual anhydride moieties are converted to carboxylic acid moieties in the aqueous medium utilized in the precipitation step. The product masses up in the solution and can be easily removed, pressed to remove the entrapped acidic solution and dried in vacuo at 40°C. for 48 hours.

Preferably, the partial ester is a full half ester of the copolymer, although partial half esters wherein the degree of esterification is from about 10% to about 50 percent of the total potential carboxyl groups on the polymer chain impart sufficient hydrophilicity to render the partially esterified copolymer useful as an enteric material. Such partial esters are within the spirit and scope of this invention.

Example 1, immediately below, is exemplary of the general process by which all of the enteric materials useful in this invention can be prepared. Variations on this process to achieve different mole ratios, within the scope of this invention, of the alkylene structural units in the copolymer will be understood by those skilled in polymer chemistry.

EXAMPLE 1

Preparation of Half Diethylene Glycol Monomethyl Ether Ester of Ethyl Acrylate-Maleic Anhydride Copolymer Step One:

About 98.0 g. of maleic anhydride (acid free) was placed in a suitable reaction vessel equipped with a condenser, a stirrer, two dropping funnels, a thermometer, and a nitrogen ebulator. The reaction vessel was heated using an oil bath kept at about 70°C. About 100.0 g. of ethyl acrylate (containing 15 ppm of p-methoxyphenol) and 0.75 g. of t-butyl peroctoate were placed in one of the dropping funnels, and about 180 ml. of benzene (thiophene free) was placed in the other funnel. The maleic anhydride was melted and brought to about 60°-65°C., and the addition of the ethyl acrylate was started at the rate of about 1.2 ml. per minute.

After about 1% of the ethyl acrylate was added, 0.25 g. of t-butyl peroctoat was added to the reaction vessel. The addition of ethyl acrylate was continued at about 1.2 ml. per minute until about 15 to 25% of the total had been added, when it became apparent that the reaction mixture had become more viscous, and the reaction had become exothermic. The reaction temperature rose rapidly, and when it reached 75°C. the heat was removed. When the reaction temperature reached 80°C., 25 ml. of benzene was added, and the reaction was continued at a temperature of about 75°C.

When the addition of the ethyl acrylate was completed, the remaining benzene was added and the reaction was continued for three additional hours at about 75°C.

Step Two:

To about 150 g. of crude ethyl acrylate-maleic anhydride copolymer contained in the benzene solution from step one was added with vigorous stirring about 1750 ml. of diethylene glycol monomethyl ether, and the temperature maintained at about 70°C. A solution of 10.0 g. of sodium methoxide in 250 ml. of diethylene glycol monomethyl ether was prepared. The solution of sodium methoxide was added to the reaction mixture as soon as the copolymer was in solution. The temperature was maintained at about 70°C. and vigorous stirring was continued for about 60 minutes. The reaction mixture was cooled to room temperature, and the reaction checked for completeness by confirming the absence of the characteristic anhydride peaks at 5.4 $\mu$ and 5.6 $\mu$ in the infrared spectrum. The product was precipitated by adding the reaction mixture, with efficient stirring, to about 20 1. of 0.1N HCl solution. The product formed a white elastomeric mass around the stirrer, and was removed and pressed to squeeze out the acidic solution trapped therein. The resulting half diethylene glycol monomethyl ether ester of ethyl acrylate-Maleic anhydride copolymer was cut into small pieces and dried under vacuum at 40°C. for 48 hours.

Useful partial esters of the copolymers described above have a molecular weight of at least about 15,000. When $n$ in the general formulas detailed hereinbefore is 70 the molecular weight of the 10 percent partial ethylene glycol monomethyl ether ester of methyl acrylate-maleic anhydride copolymer is about 14,000 when $x$ and $y$ are each 1. The preferred copolymers are those having a molecular weight of 100,000 to 300,000. However copolymers having molecular weights as high as one million or more have enteric properties and can be employed in the preferred embodiment in this invention.

Intrinsic Viscosity is an index of polymer molecular weight. This is measured by preparing a dilute solution of the polymer in a suitable solvent, such as acetone, and carrying out Intrinsic Viscosity (or Limiting Viscosity Number, L.V.N.) measurements at 30°C. according to known procedures.

To arrive at an Intrinsic Viscosity value flow times are measured for the solvent, and several dilute solutions of the polymer. A Cannon Ubbelohde Viscosimiter, or similar instrument is employed and the measurements are taken at 30°C. The Relative Viscosity at each concentration is calculated. The Relative Viscosity is the ratio of the flow time of the polymer solution to the flow time of the solvent. Specific Viscosity is calculated by subtracting the number one from each Relative Viscosity reading, and a Reduced Specific Viscosity is derived by dividing the concentration in grams per 100 ml. of solution into the Specific Viscosity number. A plot is made of the Reduced Specific Viscosity vs. concentration and a straight line of best fit is extrapolated to zero concentration. The value of the Reduced Specific Viscosity at zero concentration is known as the Intrinsic Viscosity.

To determine the consistency of the molecular weight of ethyl acrylate-maleic anhydride copolymers prepared according to step one in Example 1, some of the unesterified copolymer was isolated by diethyl ether precipitation from each of nine batches of the polymer. The Intrinsic Viscosity was determined on each batch thus isolated to find the relative molecular weight. Relative Viscosity was determined on each batch employing a Cannon Ubbelohde Viscosimeter, and the concentration of copolymer employed was respectively; 2.0 g/dl., 1.33 g/dl., 1:00 g/dl., 0.5 g/dl. and 0.25 g/dl. in acetone. The flow times were determined at 30.00°C., ±0.05°C.

Table I, below shows the Intrinsic Viscosity for each of nine batches of the copolymer of ethyl acrylate-maleic anhydride derived as described above.

TABLE I

| BATCH OF ETHYL ACRYLATE-MALEIC ANHYDRIDE COPOLYMER | INTRINSIC VISCOSITY [n], |
|---|---|
| 1 | 0.385 |
| 2 | 0.545 |
| 3 | 0.540 |
| 4 | 0.405 |
| 5 | 0.785 |
| 6 | 0.635 |
| 7 | 0.380 |
| 8 | 0.640 |
| 9 | 0.315 |

These figures indicate that copolymers having a wide range of molecular weights will form satisfactory enteric films as each of these batches of copolymers gave a successful enteric material.

Preferred compounds coming within the scope of the general formulas described above and useful in this invention are:

Partial dipropylene glycol monoethyl ether ester of ethyl acrylatemaleic anhydride copolymer;

Partial triethylene glycol mono-n-propyl ether ester of ethyl acrylate-maleic anhydride copolymer;

Partial diethylene glycol monomethyl ether ester of ethyl acrylatecitraconic anhydride copolymer;

Partial tripropylene glycol monomethyl ether ester of ethyl acrylatecitraconic anhydride copolymer;

Partial triethylene glycol monoethyl ether ester of isobutyl acrylate-itaconic anhydride copolymer;

Partial diethylene glycol monomethyl ether ester of ethyl acrylateitaconic anhydride copolymer;

Partial tetraethylene glycol monomethyl ether ester of ethyl acrylate-maleic anhydride copolymer;

Partial diethylene glycol monoisobutyl ether ester of ethyl acrylatemaleic anhydride copolymer;

Partial diethylene glycol monoisopropyl ether ester of methyl acrylate-citraconic anhydride copolymer;

Partial dipropylene glycol monomethyl ether ester of isobutyl acrylate-itaconic anhydride copolymer.

Especially preferred compounds are:

I. Partial (50%) ethylene glycol monomethyl ether ester of ethyl acrylate-maleic anhydride copolymer;
II. Partial (50%) propylene glycol monomethyl ether ester of ethyl acrylate-maleic anhydride copolymer;
III. Partial (50%) diethylene glycol monomethyl ether ester of ethyl acrylate-maleic anhydride copolymer;
IV. Partial (50%) dipropylene glycol monomethyl ether ester of ethyl acrylate-maleic anhydride copolymer;
V. Partial (50%) diethylene glycol monomethyl ether ester of n-butyl acrylate-maleic anhydride copolymer;
VI. Partial (50%) diethylene glycol monomethyl ether ester of isobutyl acrylate-maleic anhydride copolymer.
VII. Partial (50%) diethylene glycol monomethyl ether ester of ethyl acrylate-maleic anhydride copolymer.

The enteric properties of the especially preferred compounds were demonstrated by casting films from 10% acetone solutions and determining the lowest pH, in half unit intervals, at which the film was soluble. Table I, below shows the lowest pH at which each partial ester of the copolymer dissolved in less than 60 minutes.

TABLE II

| Copolymer[1] | pH at Which Copolymer Dissolved in Less Than 60 minutes |
|---|---|
| (I) | 6.0 |
| (II) | 6.0 |
| (III) | 5.5 |
| (IV) | 6.0 |
| (V) | 7.0 |
| (VI) | 7.0 |
| (VII) | 6.0 |

[1]Roman numerals in parentheses correspond with copolymer compounds listed in the especially preferred list above.

One of the aspects of this invention relates to an enteric medicament which comprises a drug protected by a partial alkylene glycol ether ester of a $C_1$-$C_4$ alkyl acrylate-unsaturated polybasic carboxylic acid anhydride copolymer, or a combination of two or more of such copolymers. The partially esterified copolymer, or combinations thereof, are selected from the class of enteric materials described hereinbefore with greater particularity.

Another aspect of this invention relates to the utilization of the useful partially esterified copolymers as defined above in the formulation of sustained-release preparations. Such preparations comprise a medicament wherein there is present in combination (1) a drug protected from the gastric environment by a partial alkylene glycol ether ester of a $C_1$-$C_4$ alkyl acrylate-unsaturated polybasic carboxylic acid anhydride copolymer, or a blend of two or more of such copolymers, and (2) a drug in a form in which it will be released in the stomach. Generally, the sustained-release medicaments of this invention comprise an unprotected drug in admixture with various protected fractions of the drug, each of which is designed to release the drug at a specific pH. Sustained-release medicaments are designed to release a predetermined amount of the drug upon ingestion into the stomach, followed by subsequent fractional releases upon reaching certain areas of the gastro-intestinal tract to produce a sustained-release effect.

In some situations the sustained-release medicaments of this invention can contain, in addition to the above described pH dependent releasing factors, solution-rate-extending materials to provide for time control of the release to avoid premature release of the drug when hyperactive peristalisis moves the enteric medicament along too rapidly in the intestinal tract. Illustrative of such solution-rate-extending materials are fatty alcohols, acids, waxes, mono-, di-, and triglycerides and esters thereof, esters of dicarboxylic acids, and the like. Among the drugs which may be advantageously used in sustained-release dosage forms are amphetamines, barbiturates, acetysalicylic acid, d-propoxyphene hydrochloride, adrenocorticosteroids, and phenothiazine.

The novel partially esterified copolymers of this invention demonstrate widely varying degrees of flexibility. As is shown in Table II above, the pH at which individual members of the class dissolve also varies considerably. These copolymers are mutually compatible and can be blended to provide an enteric material having a flexibility, hydrophilicity, and dissolving pH appropriate to the drug to be protected from the gastric environment. These copolymers, when utilized to protect a drug, form highly effective, reliable and exceptionally economical enteric and sustainedrelease medicaments. Moreover, because of the wide pH range over which various copolymers in this group dissolve, certain of these enteric materials can be employed to provide medicaments from which the drug is released at the pH of that part of the gastro-intestinal tract where there is optimum absorption. For example, some drugs are better absorbed from the duodenum than the jejunum, or any other intestinal locus, and thus this invention provides enteric materials which will dissolve at the pH of 5.5 to 6.0, a pH generally found in the environment of the lower duodenum. On the other hand, certain of the copolymers useful in this invention do not dissolve until the pH is 7.0 or above and consequently will protect the drug far down into the intestinal tract.

A partial (50%) 2-dimethylaminoethanol ester of ethyl acrylatemaleic anhydride copolymer, representative of the compounds taught and claimed in U.S. Pat. No. 3,509,111, was prepared and tested for its enteric properties. It was found that films made from such copolymers were unsuitable as enteric coatings inasmuch as such films were soluble in simulated gastric fluid, dissolving completely in about 10 minutes at pH 2–2.5.

Additionally, a copolymer of vinyl actate and methoxy polyethylene glycol maleate half ester was prepared according to the procedure described in Example 4 of British Pat. No. 1,133,277 and tested for its enteric properties. It was found that the copolymer so prepared was insoluble in both simulated gastric and simulated intestinal fluids. In fact, it was insoluble at any pH from 1 to 11, making it totally unsuitable as an enteric coating.

Furthermore, two of the methoxy polyethylene glycols taught as esterifying agents in British Pat. No. 1,133,277 were utilized in preparing partial (50%) esters of the ethyl acrylate-maleic anhydride copolymer. Glycols having molecular weights of about 350 and about 550 were independently reacted with such copolymer. In both cases the half esters of the copolymers dissolved in simulated gastric fluid in from 5 to 10 minutes, indicating that such esters were unsuitable as enteric coatings.

The useful partially esterified copolymers of this invention can be used to protect the drug in a variety of different procedures as, for example, (1) liquid coating procedures, such as spray coating, pan coating, fluidized bed coating, and the like; (2) dry coating techniques, such as press coating of tablets, electrostatic impingement coating of tablets and capsules; and (3) drug-enteric material (i.e., novel partially esterified copolymers of this invention) mixtures, such as homogenous admixtures. In the case of homogenous admixtures the drug can be intimately mixed with the enteric material as a dry powder, solution, suspension, or melt. Liquid mixtures are dried and ground, and melts are cooled and ground. The dry drug-enteric material mixtures can then be employed as powders or granules, or further processed into tablets, pellets, capsules, granules, powders, and similar pharmaceutical dosage forms.

Inasmuch as the preparation of the useful partially esterified copolymers of this invention was fully described in Example 1, hereinbefore, the following examples will serve to illustrate the utilization of various of these compounds in the preparation of enteric, and sustained-release, medicaments.

EXAMPLE 2

Approximately 2.5 kg. of 500 mg. para-aminosalicylic acid (PAS) tablets were placed in a 16 inch tablet coating pan turning at 10 to 12 r.p.m. Three applications of heavy syrup were applied to the tablets, each followed by a dusting coat of a 2:1 mixture of magnesium oxide and bolted talc. The tablets were removed from the pan and dried overnight at 37°C.

The dried partially coated tablets were returned to the coating pan and a seal coat of shellac was applied, followed by a dust coat comprised of 8 ⅔ parts bolted talc and 1 ⅓ parts of acacia. After thorough drying in the rotating pan, a final sub-coat was applied comprised of successively; a dust coat of a mixture of 2 ¾ parts of acacia and 3 ½ parts of sucrose; two successive applications of heavy syrup; and a dust coat of a mixture of 7 parts calcium sulfate, 2 ½ parts bolted talc and ½ part acacia. The coated tablets were then removed from the pan and dried overnight at 37°C.

The thus prepared sub-coated PAS tablets were divided into three equal quantities, section A, section B and section C. Each of sections A, B, and C were coated with a useful copolymer of this invention.

Coating of section A:

A 5% solution of the essentially half diethylene glycol monomethyl ether ester of ethyl acrylate-maleic anhydride copolymer in a 1:1 mixture of acetone and ethyl acetate, and containing 0.5% of an acetylated monoglyceride distilled from prime lard was placed in a spray gun. The spray gun was adjusted to give a fine spray, and the above described solution applied to the sub-coated PAS tablets in the 16 inch coating pan rotating at 10–12 r.p.m. The solution was sprayed onto the tablets at a rate that allowed for a continuous rapid evaporation of the solvent without a build-up of unevaporated solvent on the tablets. The spray mixture was applied to the tablets until there was about 20 mg. of coating on each tablet, determined by weighing 100 tablets both before and after coating and noting the difference. The solvents were evaporated from the thus coated tablets by blowing warm air over the tumbling tablets in the coating pan.

Coating of sec. B

A 5% solution of the essentially half diethylene glycol monomethyl ether ester of isobutyl acrylate-maleic anhydride copolymer in a 1:1 mixture of acetone and ethyl acetate, and containing 0.5% of an acetylated monoglyceride distilled from prime lard was prepared and applied to the subcoated PAS tablets as was described in coating section A.

Coating of section C.

A 5% solution of the essentially half dipropylene glycol monomethyl ether ester of ethyl acrylate-maleic anhydride copolymer in a 1:1 mixture of acetone and ethyl acetate, and containing 0.5% of an acetylated monoglyceride distilled from prime lard was prepared and applied to the sub-coated PAS tablets as was described in coating section A.

Tablets from each of the sections coated as described above were then submitted to the Tablet Disintegration Test for enteric coated tablets described in United States Pharmacopoeia XVII, on page 920. This test conclusively proved that protective coatings of the essentially half diethylene glycol monomethyl ether ester of ethyl acrylate-maleic acid copolymer, or the essentially half diethylene glycol monomethyl ether ester of isobutyl acrylatemaleic anhydride copolymer, or the essentially half dipropylene glycol monomethyl ether ester of ethyl acrylatemaleic anhydride copolymer are excellent enteric materials.

EXAMPLE 3

About 2 kg. of placebo-filled, clear no. 1 gelatin capsules were placed in a 16 inch coating pan turning at 10–12 r.p.m. A 5% solution of the essentially half diethylene glycol monomethyl ether ester of ethyl acrylate-maleic acid copolymer in a 1:1 mixture of acetone and ethyl acetate, and containing about 0.5% of an acetylated monoglyceride distilled from prime lard was prepared and placed in a spray gun. The solution was sprayed onto the tumbling capsules through a fine nozzle until the coating on each capsule had accumulated to about 50 mg. of solids, determined by weighing capsules before and after coating. The solvent was then evaporated from the coating by blowing warm air over the moving capsules.

The thus coated capsules were submitted to the Tablet Disintegration Test for enteric coated tablets noted in Example 2. The capsules met the test for enteric coated tablets in that they were intact in simulated gastric fluid after one hour, and dissolved in simulated intestinal fluid in ten minutes demonstrating the effectiveness of the protective coating as an enteric material.

EXAMPLE 4

A sustained-release medicament is prepared in the following manner.

Small sugar pellets (non-pareils) having a size of from about 16 to 30 mesh are placed in a standard tablet coating pan, and the pan is rotated at 24 r.p.m. An application of an aqueous solution of gum acacia is made to the tumbling pellets and the tumbling continued until the gum acacia becomes sticky. Then d-propoxyphene hydrochloride having a particle size of from about 100 to 200 mesh is dusted on the bed of pellets until all of the tack is gone and the tablets are rolling freely. The addition of gum acacia and d-propoxyphene hydrochloride is continued alternately until the pellets are comprised of from about 50 to 60 percent d-propoxyphene hydrochloride. For each 3.25 kg. of starting sugar pellets there is added about 0.75 kg. of gum acacia and 6.0 kg. of d-propoxyphene hydrochloride. As there is a loss of d-propoxyphene hydrochloride on the walls of the coating pan, and because of the character of the coating operation, the amount of gum acacia required may vary. The final concentration of d-propoxyphene hydrochloride in the pellets is determined by assay.

After all of the d-propoxyphene hydrochloride has been added to the pellets, a sugar coating is applied to finish the pellets. The finished pellets are then divided into three equal portions, Sections A, B, and C. Section A is set aside to be recombined in the sustained-release medicament after the other two sections have been converted into enteric-medicaments which release the d-propoxyphene hydrochloride at different pH's.

Section B is converted into an enteric medicament as follows: The pellets are placed in a standard 16 inch tablet coating pan and the pan is rotated at about 48 r.p.m. A 5% solution of the essentially half diethylene glycol monomethyl ether ester of ethyl-acrylate-maleic acid copolymer in a 1:1 mixture of acetone and ethyl acetate and containing 0.5% of an acetylated monoglyceride distilled from prime lard is prepared and is placed in a spray gun. The spray gun is adjusted to give a fine spray, and the above described solution applied to the pellets. The solution is sprayed at a rate that allows for a continuous rapid evaporation of the solvent without a build-up of unevaporated solvent on the pellets. The spray mixture is applied to the pellets until the copolymer coating comprises about 15% of the coated pellets, determined by weight difference before and after coating. The remaining solvents are evaporated from the thus coated pellets by blowing warm air over the tumbling pellets in the coating pan. A final sugar coating is added by applying light sugar syrup to the pellets and evaporating the water therefrom.

Section C is coated in the same manner as Section B, except that the copolymer coating is the partial (50%) diethyleneglycol monomethyl ether ester of isobutyl acrylate-maleic acid copolymer.

Section A will release the d-propoxyphene hydrochloride immediately upon ingestion. Section B is designed to release the d-propoxyphene hydrochloride when the pellets reach a point in the gastro-intestinal tract where the pH is about 5.5 to 6.0, and the d-propoxyphene hydrochloride in Section C will become physiologically available in a pH environment of about 7.0 to 7.5.

Sections A, B, and C are recombined and thoroughly mixed, and filled into two-piece hard gelatin capsules to yield a sustained-release medicament that will release d-propoxyphene hydrochloride for absorption at three different locations in the gastro-intestinal tract.

In still another aspect of this invention the novel partial alkylene glycol ether esters of $C_1$-$C_4$ alkyl acrylateunsaturated polybasic carboxylic acid anhydride copolymers are combined with $C_1$-$C_4$ alkanol esters of $C_1$-$C_4$ alkyl acrylateunsaturated polybasic carboxylic acid anhydride copolymers to provide enteric compositions of superior usefulness. The ratio of the partial alkylene glycol ether esterified copolymer to the alkanol esterified copolymer can be from 9 to 1 to 1 to 9. Preferably the ratio is about 1 to 1.

The alkanol esterified copolymers useful in this aspect of the instant invention are selected from the general formulas

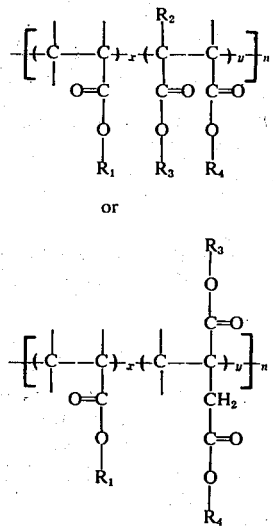

wherein
$R_1$ is $C_1$-$C_4$ alkyl;
$R_2$ is hydrogen or methyl;
$R_3$ and $R_4$ are hydrogen or $C_1$-$C_4$ alkyl;
with the proviso that from about 10 to about 50 percent of the total potential of $R_3$ and $R_4$ is other than hydrogen; $n$ is above 70; and $x$ and $y$ are whole numbers from 1 to 5.

The alkanol esterified copolymers are prepared by following the same procedures as are provided in Example 1, above, except that the desired alkanol is used in place of the alkylene glycol ether.

The alkanol esterified copolymers described hereinbefore have enteric properties in their own right, and have been previously described in U.S. Pat. No. 3,143,472. However, these esterified copolymers tend to be brittle and a relatively thick film must be employed to assure the integrity of the coating. Moreover, the brittle character of the film formed from these esterified copolymers necessitates great care in handling the coated objects to avoid cracking the film and rendering the coating pervious to gastric fluid in the stomach negating the enteric properties of the film.

Furthermore, the alkanol esterified copolymers generally dissolve at higher pH's than counterpart alkylene glycol ether esterified copolymers. As a result the versatility of the former is reduced, thus limiting the useful pH range of the enteric compositions prepared therefrom to those drugs which are absorbed in the higher alkaline sections of the intestinal track. Table IIa, below shows the Ph at which certain alkanol esterified copolymers dissolve.

TABLE IIa

| Copolymer[1] | pH at which Copolymer Dissolved in Less than 60 minutes |
|---|---|
| (VIII) | 7.0 |
| (IX) | 7.0 |
| (X) | 7.0 |

TABLE IIa-Continued

| Copolymer[1] | pH at which Copolymer Dissolved in Less than 60 minutes |
|---|---|
| (XI) | 8.0 |
| (XII) | 8.0 |

[1]Copolymers in Table IIa, above.
(VIII) Partial (50%) methyl ester of ethyl acrylate-maleic anhydride copolymer;
(IX) Partial (50%) ethyl ester of ethyl acrylate-maleic anhydride copolymer;
(X) Partial (50%) isopropyl ester of ethyl acrylate-maleic anhydride copolymer;
(XI) Partial (50%) methyl ester of n-butyl acrylate-maleic anhydride copolymer;
(XII) Partial (50%) methyl ester of isobutyl acrylate-maleic anhydride copolymer.

The dissolving times shown in TABLE IIa are for films prepared as described for TABLE II.

Quite unexpectedly it was discovered that most enteric compositions prepared from blends of alkanol esterified copolymers and alkylene glycol ether esterified copolymers are more readily and economically processed than when either of the esterified copolymers are employed alone. This is because the two classes of esterified copolymers complement one another when blended together. The copolymers are mutually compatible in all proportions. Inasmuch as the alkylene glycol esterified copolymers are highly flexible, but slow drying because of their great hydrophilicity; while the alkanol esterified copolymers are brittle, but relatively fast drying, the combination of the two makes for fast and economic processing with good film forming properties. The benefit is a dependable enteric composition that can be designed to dissolve over a relatively wide pH range which can be processed economically and consistently.

Enteric compositions comprising combinations of $C_1$-$C_4$ alkanol esters of $C_1$-$C_4$ alkyl acrylate-unsaturated polybasic carboxylic acid anhydride copolymer and alkylene glycol ether esters of $C_1$-$C_4$ alkyl acrylate-unsaturated polybasic carboxylic acid anyydride copolymer can be prepared following procedures similar to those described in Examples 2 and 3. The difference is in the combination of the two classes of esterified copolymers in a ratio of from 9 to 1 to 1 to 9. The same solvent systems can be employed and the concentrations of the solute are similar. A preferred combination of esterified copolymers is a 1 to 1 weight blend of partial (50%) methyl ester of ethyl acrylate-maleic anhydride copolymer and partial (50) diethylene glycol monomethyl ether ester of ethyl acrylate-maleic anhydride copolymer.

Similarly, a sustained release medicament can be prepared utilizing a combination of an alkanol esterified copolymer and an alkylene glycol ether esterified copolymer. Example 5 illustrates this concept.

EXAMPLE 5

Non-pareils are processed following the procedure outlined in Example 4 through the step of dividing the drug containing pellets into three equal portions, Sections, A, B, and C. Section A is set aside to be recombined with Sections B and C after B and C are processed further.

Section B is converted into an enteric medicament as follows: The pellets are placed in a standard 16 inch tablet coating pan and the pan is rotated at about 48 r.p.m. A 5% solution of a 1:1 mixture of the partial (50%) methyl ester of ethyl acrylate-maleic anhydride copolymer and the partial (50%) diethylene glycol monomethyl ether ester of ethyl acrylatemaleic anhydride copolymer in a 1:1 mixture of acetone and ethyl acetate and containing 0.5% of an acetylated monoglyceride distilled from prime lard is prepared and is placed in a spray gun. The spray gun is adjusted to give a fine spray, and the above described solution applied to the pellets. The solution is sprayed at a rate that allows for a continuous rapid evaporation of the solvent without a build-up of unevaporated solvent on the pellets. The spray mixture is applied to the pellets until the copolymer coating comprises about 15% of the coated pellets, determined by weight difference before and after coating. The remaining solvents are evaporated from the thus coated pellets by blowing warm air over the tumbling pellets in the coating pan. A final sugar coating is added by applying light sugar syrup to the pellets and evaporating the water therefrom.

Section C is coated in the same manner as Section B, except that the copolymer coating is a 1:5 mixture of the partial (50%) methyl ester of isobutyl acrylate-maleic acid copolymer and the partial (50%) diethylene-glycol monomethyl ether ester of isobutyl acrylate-maleic acid copolymer.

Section A will release the d-propoxyphene hydrochloride immediately upon ingestion. Section B is designed to release the d-propoxyphene hydrochloride when the pellets reach a point in the gastro-intestinal tract where the pH is about 5.5 to 6.0, and the d-propoxyphene hydrochloride in Section C will become physiologically available in a pH environment of about 7.0 to 7.5.

Section A, B, and C are recombined and thoroughly mixed and filled into two-piece hard gelatin capsules to yield a sustained-release medicament that will release d-propoxyphene hydrochloride for absorption at three different locations in the gastro-intestinal tract.

What is claimed is:

1. An enteric medicament comprising a drug protected from the gastric environment by a coating comprised of a partial alkylene glycol ether ester of a $C_1$-$C_4$ alkyl acrylate-unsaturated polybasic carboxylic acid anhydride copolymer selected from the group having as a general formula either

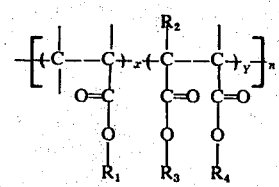

or

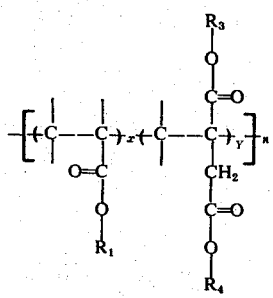

wherein
R$_1$ is C$_1$-C$_4$ alkyl;
R$_2$ is hydrogen or methyl;
R$_3$ and R$_4$ are hydrogen or the moiety

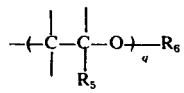

wherein
R$_5$ is hydrogen or methyl, and R$_6$ is C$_1$-C$_4$ alkyl;
with the proviso that from about 10 to about 50 percent of the total potential of R$_3$ and R$_4$ is other than hydrogen;
n is above 70;
q is a whole number from 1 to 4; and
x and y are whole numbers from 1 to 5.

2. An enteric medicament according to claim 1, wherein the coating comprises the partial diethylene glycol monomethyl ether ester of ethyl acrylate-maleic anhydride copolymer.

3. An enteric medicament according to claim 1 wherein the coating comprises the partial dipropylene glycol monomethyl ether ester of n-butyl acrylate-itaconic anhydride copolymer.

4. An enteric medicament according to claim 1 wherein the coating comprises the partial triethylene glycol monoethyl ether ester of isobutyl acrylate-maleic anhydride copolymer.

5. An enteric medicament according to claim 1 wherein the coating comprises the partial diethylene glycol monomethyl ether ester of methyl acrylate-citraconic anhydride copolymer.

6. An enteric medicament according to claim 1 wherein the coating comprises the partial propylene glycol monomethyl ether ester of isopropyl acrylate-maleic anhydride copolymer.

7. A sustained release medicament comprising (1) a drug and (2) the composition of claim 1.

8. An enteric composition comprising a drug protected from the gastric environment by a coating comprised of a combination of a compound according to claim 1 and a partial C$_1$-C$_4$ alkanol ester of a C$_1$-C$_4$ alkyl acrylateunsaturated polybasic carboxylic acid anhydride copolymer selected from the group having as a general formula either

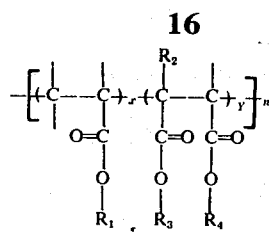

or

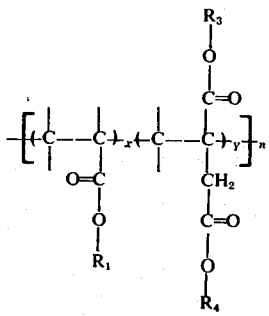

Wherein
R$_1$ is C$_1$-C$_4$ alkyl;
R$_2$ is hydrogen or methyl;
R$_3$ and R$_4$ are hydrogen or C$_1$-C$_4$ alkyl;
with the proviso that from about 10 to about 50 percent of the total potential of R$_3$ and R$_4$ is other than hydrogen;
n is above 70; and
x and y are whole numbers from 1 to 5.

9. The composition of claim 8 wherein the coating comprises a mixture of the partial methyl ester of ethyl acrylate-maleic anhydride copolymer and the partial diethylene glycol mono-methyl ether ester of ethyl acrylate-maleic anhydride copolymer.

10. The composition of claim 9 wherein the ratio of the partial methyl ester of ethyl acrylate-maleic anhydride copolymer to the partial diethylene glycol monomethyl ether ester of ethyl acrylate-maleic anhydride copolymer is from about 1 to 9 to about 9 to 1.

11. The composition of claim 10 wherein the ratio of the partial methyl ester of ethyl acrylate-maleic anhydride copolymer to the partial diethylene glycol monomethyl ether ester of ethyl acrylate-maleic anhydride copolymer is about 1:1.

12. A sustained release medicament comprising (1) a drug and (2) the composition of claim 8.

* * * * *